United States Patent [19]

Mark et al.

[11] Patent Number: 4,638,027

[45] Date of Patent: Jan. 20, 1987

[54] POLYCARBONATE EXHIBITING IMPROVED HEAT RESISTANCE FROM CYCLOALKYLIDENE DIPHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 684,098

[22] Filed: Dec. 20, 1984

Related U.S. Application Data

[63] Continuation-in-part of Ser. No. 453,105, Dec. 27, 1982, abandoned.

[51] Int. Cl.$^4$ ............................................. C08G 63/62
[52] U.S. Cl. .................................. 524/157; 524/611; 528/125; 528/171; 528/174; 528/196; 528/204
[58] Field of Search ............... 528/196, 204, 125, 171, 528/174; 524/157, 611

[56] References Cited

U.S. PATENT DOCUMENTS

| | | | |
|---|---|---|---|
| 3,422,065 | 1/1969 | Wulff et al. | 528/196 |
| 4,129,546 | 12/1978 | Axelrod et al. | 528/196 |
| 4,180,651 | 12/1979 | Mark | 528/196 |
| 4,299,948 | 11/1981 | Weirauch et al. | 528/196 |
| 4,304,899 | 12/1981 | Mark et al. | 528/196 |

*Primary Examiner*—Harold D. Anderson
*Attorney, Agent, or Firm*—Myron B. Kapustij; Martin B. Barancik

[57] ABSTRACT

Thermoplastic, linear, high molecular weight, end-capped aromatic polycarbonate polymers exhibiting improved heat resistance derived from:
 (i) a carbonate precursor; and
 (ii) at least one dihydric phenol represented by the general formula

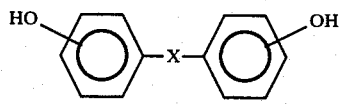

wherein X is selected from monocyclic cycloalkylidene radicals containing from 10 to about 16 ring carbon atoms. These polycarbonate polymers have an intrinsic viscosity in methylene chloride at 25° C. of at least 0.38 dl./gm.

33 Claims, No Drawings

POLYCARBONATE EXHIBITING IMPROVED HEAT RESISTANCE FROM CYCLOALKYLIDENE DIPHENOL

RELATED APPLICATIONS

This application is a continuation-in-part application of copending application Ser. No. 453,105 filed Dec. 27, 1982, now abandoned.

BACKGROUND OF THE INVENTION

Polycarbonates are well known thermoplastic materials which, due to their many advantageous properties, find use as thermoplastic engineering materials in many commercial and industrial applications. The polycarbonates exhibit, for example, excellent properties of toughness, impact strength, and heat resistance. The polycarbonates are generally prepared by the coreaction of a dihydric phenol such as bisphenol-A with a carbonate precursor such as phosgene.

While the presently available conventional polycarbonates are quite useful in a wide range of applications there nevertheless exists a need, especially in applications involving high temperature environments, for polycarbonates exhibiting, to a substantial degree, substantially most of the advantageous properties of conventional polycarbonates and also exhibiting greater heat resistance than that possessed by conventional polycarbonates.

It is, therefore, an object of the instant invention to provide polycarbonates exhibiting improved heat resistance.

SUMMARY OF THE INVENTION

In accordance with the instant invention there are provided linear, thermoplastic, high molecular weight, end-capped, aromatic polycarbonate resins which exhibit improved heat resistance.

These polycarbonates are comprised of at least one repeating structural unit represented by the general formula

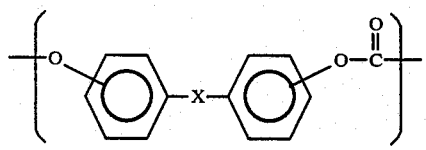

wherein X represents a monocyclic cycloalkylidene radical containing from 10 to about 16 ring carbon atoms.

DESCRIPTION OF THE INVENTION

It has been discovered that linear, thermoplastic, high molecular weight, end-capped, aromatic carbonate polymers can be obtained which exhibit improved heat resistance as compared to conventional polycarbonates while simultaneously retaining, to a substantial degree, substantially most of the other advantageous properties of conventional polycarbonates.

These novel polycarbonates are derived from
(i) a carbonate precursor; and
(ii) at least one dihydric phenol represented by the general formula

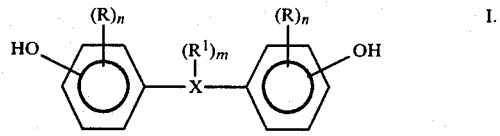

wherein:
R is independently selected from halogen radicals, monovalent hydrocarbon radicals, and monovalent hydrocarbonoxy radicals,
$R^1$ is independently selected from monovalent hydrocarbon radicals;
X represents a monocyclic cycloalkylidene radical containing from 8 to about 16 ring carbon atoms;
n is independently selected from whole numbers having a value of from 0 to 4 inclusive; and
m is a whole number having a value of from 0 up to the number of hydrogen atoms present on X available for replacement.

The halogen radicals represented by R are preferably selected from chlorine and bromine.

The monovalent hydrocarbon radicals represented by R are selected from alkyl radicals, aryl radicals, aralkyl radicals, alkaryl radicals, and cycloalkyl radicals. The preferred alkyl radicals represented by R are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by R are those containing from 6 to 12 carbon atoms, i.e., phenyl, naphthyl and biphenyl. The preferred aralkyl and alkaryl radicals represented by R are those containing from 7 to about 14 carbon atoms. Some illustrative non-limiting examples of these alkaryl and aralkyl radicals include benzyl, tolyl, ethylphenyl, and the like. The preferred cycloalkyl radicals represented by R are those containing from 4 to about 6 ring carbon atoms and include cyclobutyl, cyclopentyl and cyclohexyl.

The monovalent hydrocarbonoxy radicals represented by R are preferably selected from alkoxy and aryloxy radicals. The preferred alkoxy radicals are those containing from 1 to about 8 carbon atoms and include, for example, methoxy, butoxy, propoxy, isopropoxy, and the like. The preferred aryloxy radical is phenoxy.

Preferably R is independently selected from monovalent hydrocarbon radicals, with the alkyl radicals being the preferred hydrocarbon radicals.

The monovalent hydrocarbon radicals represented by $R^1$ are selected from alkyl radicals, aryl radicals, alkaryl radicals, aralkyl radicals, and cycloalkyl radicals. The preferred alkyl radicals are those containing from 1 to about 8 carbon atoms. Some illustrative non-limiting examples of these alkyl radicals include methyl, ethyl, propyl, isopropyl, butyl,isobutyl, tertiary butyl, pentyl, neopentyl, and the like. The preferred aryl radicals are those containing from 6 to 12 carbon atoms, i.e., phenyl, naphthyl and biphenyl. The preferred aralkyl and alkaryl radicals represented by $R^1$ are those containing from 7 to about 14 carbon atoms. Some illustrative non-limiting examples of these preferred aralkyl and alkaryl radicals include benzyl, tolyl, ethylphenyl, and the like. The preferred cycloalkyl radicals represented by $R^1$ are those containing from 4 to 6 ring carbon atoms, i.e., cyclobutyl, cyclopentyl and cyclohexyl.

The preferred monovalent hydrocarbon radicals represented by $R^1$ are the alkyl radicals.

In the dihydric phenol compounds of Formula I if more than one R substituent is present on the aromatic nuclear residue they can be the same or different.

Likewise, if more than one $R^1$ substituent is present on the cycloalkylideneradical represented by X they may be the same or different.

In Formula I m preferably represents a whole number having a value of from 0 to 6.

The preferred dihydric phenols of Formula I are the 4,4'-bisphenols.

The cycloalkylidene radicals represented by X are the monocyclic cycloalkylidene radicals which may be represented by the general formula

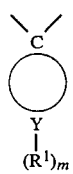

wherein $R^1$ and m are as defined hereinafore, and Y represents an alkylene radical containing from 7 to about 15 carbon atoms which together with the C atom form a monocyclic cycloalkylidene radical containing from 8 to about 16 ring carbon atoms. That is to say, Y represents the ($-CH_2-$)r radical wherein r is a positive integer having a value of from 7 to about 15. Preferably Y is an alkylene radical containing from 9 to about 15 carbon atoms, i.e., r is an integer having a value of from 9 to 15, thus forming a monocyclic cycloalkylidene radical X containing from 10 to about 16 ring carbon atoms. More preferably Y is an alkylene radical containing from 10 to about 15 carbon atoms, i.e., r is an integer having a value of from 10 to 15, thus forming a monocyclic cycloalkylidene radical X containing from 11 to about 16 ring carbon atoms. Most preferably Y is an alkylene radical containing from 11 to 13 carbon atoms, i.e., r is an integer having a value of from 11 to 13, thus forming a monocyclic cycloalkylidene radical X having from 12 to about 14 ring carbon atoms. It is preferred that m be zero.

The term monocyclic as used herein with respect to the cycloalkylidene radicals X is meant to specify that the cycloalkylidene radicals contain only one ring, i.e., they are non-polycyclic. Thus, these non-polycyclic cycloalkylidene radicals do not include those cyclic groups which are not monocyclic, e.g., bicyclic, bridged or fused cyclic structures such as 2-norbornylidene, bicyclo(3.3.0)octene, and decahydronaphthylene.

Preferred polycarbonates, from the standpoint of exhibiting particularly improved heat resistance, are those containing at least one recurring structual unit represented by the general formula

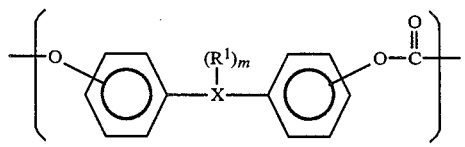

II.

wherein:

$R_1$ is independently selected from monovalent hydrocarbon radicals;

X represents a monocyclic cycloalkylidene radical containing from 10 to about 16 ring carbon atoms; and m is selected from a whole number having a value of from 0 up to the number of replaceable hydrogen atoms present on X.

These linear polycarbonates are derived from dihydric phenols of Formula I wherein n is zero and X represents a monocyclic cycloalkylidene radical containing from 10 to about 16 ring carbon atoms, i.e., those dihydric phenols represented by the general formula

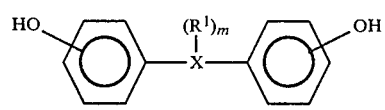

Ia.

wherein $R^1$ and m are as defined hereinafore, and X is selected from monocyclic cycloalkylidene radicals containing from 10 to about 16 ring carbon atoms.

Preferred linear polycarbonates containing at least one recurring structural unit represented by Formula II are those wherein m in Formula II is zero. These polycarbonates are derived from dihydric phenols of Formula Ia wherein m is zero.

Preferred polycarbonates containing at least one recurring structural unit of Formula II wherein m is zero are those containing at least one repeating structural unit represented by the general formula

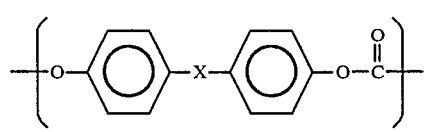

IIa.

wherein X represents a monocyclic cycloalkylidene radical containing from 10 to about 16 ring carbon atoms. These linear polycarbonates are derived from dihydric phenols represented by the general formula

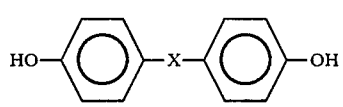

Ib.

wherein X is selected from monocyclic cycloalkylidene radicals containing from 10 to about 16 ring carbon atoms.

Preferred linear polycarbonates of Formula II or IIa are those wherein X is selected from monocyclic cycloalkylidene radicals containing from 11 to about 16 ring carbon atoms. These polycarbonates are derived from dihydric phenols of Formulae Ia or Ib, respectively, wherein X is selected from monocyclic cycloalkylidene radicals containing from 11 to about 16 ring carbon atoms.

More preferred linear polycarbonates containing at least one recurring structural unit of Formulae II or IIa are those wherein X is selected from monocyclic cycloalkylidene radicals containing from 12 to about 16 ring carbon atoms. These more preferred polycarbonate are derived from dihydric phenols of Formulae Ia or Ib, respectively, wherein X is selected from monocyclic cyaloalkylidene radicals containing from 12 to about 16 ring carbon atoms.

Particularly useful linear polycarbonates containing at least one recurring structural unit represented by Formula II or by Formula IIa are those wherein X is selected from monocyclic cycloalkylidene radicals containing from 12 to 14 ring carbon atoms. These polycarbonates are derived from dihydric phenols of Formulae Ia or Ib, respectively, wherein X is selected from monocyclic cycloalkylidene radicals containing from 12 to 14 ring carbon atoms.

Some illustrative non-limiting examples of dihydric phenols of Formula Ib include:

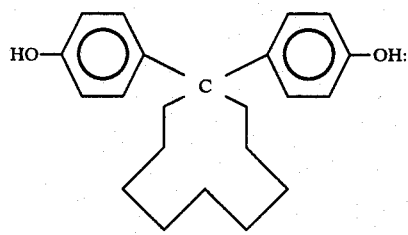

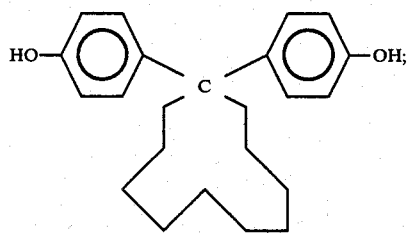

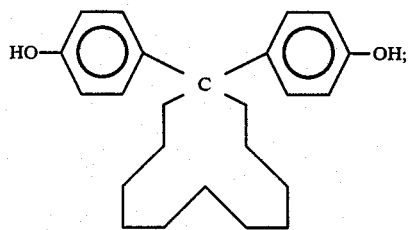

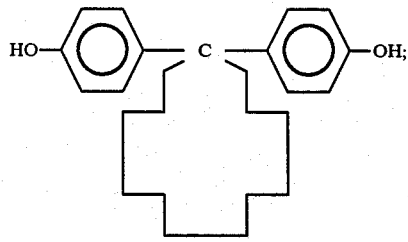

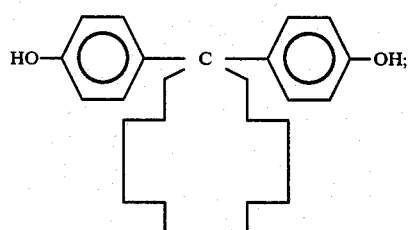

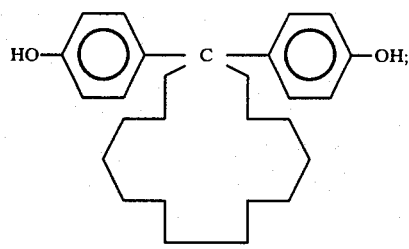

and

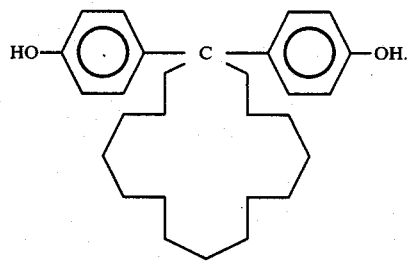

The dihydric phenols of Formula I, and particularly those of Formulae Ia or Ib, are prepared by the reaction of a particular ketone with a phenol in the presence of an acid catalyst, preferably in the presence of an acid catalyst and a cocatalyst such a butyl mercaptan.

The particular ketone reactant is selected from ketones represented by the general formula

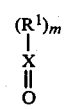     III.

$$\begin{matrix} (R^1)_m \\ | \\ X \\ \| \\ O \end{matrix}$$

wherein $R^1$, m and X are defined hereinafore. Preferred ketones are those wherein X represents a monocyclic cycloalkylidene radical containing from 10 to about 16 ring carbon atoms. More preferred ketones are those wherein X represents a cycloalkylidene radical containing from 11 to about 16 ring carbon atoms, while the most preferred ketones are those wherein X represents a monocyclic cycloalkylidene radical containing from 12 to about 16 ring carbon atoms.

More particularly, the ketone of Formula III may be represented by the general formula

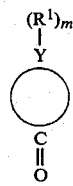     IV.

wherein $R^1$ and Y are as defined hereinafore, and m' represents a whole number having a value of from 0 up to the number or replaceable hydrogen atoms present in Y.

The phenol reactants are selected from phenols represented by the general formula

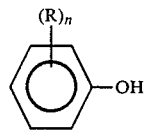

wherein R and n are as defined hereinafore.

The preferred phenol reactants of Formula V, from the standpoint of providing dihydric phenols which yield polycarbonates exhibiting particularly good heat resistances, are those wherein n is zero.

In order to obtain the dihydric phenols of Formula I, and particularly of Formulae Ia or Ib, one mole of the ketone of Formula IV is reacted with two moles of the phenol of Formula V in the presence of an acid catalyst and a coacatalyst such as butyl mercaptan. Generally, the phenol reactant is present in excess. Rather than utilizing only one phenol reactant a mixture of two or more different phenol reactants may be employed.

Some illustrative non-limiting examples of suitable acid catalysts that may be employed include hydrochloric acid, hydrobromoic acid, poly(styrene sulfonic acid), sulfuric acid, benzene sulfonic acid, and the like. The phenol of Formula V is reacted with the ketone of Formula IV under conditions of temperature and pressure, and in the presence of the acid catalyst, such that the coreaction between said phenol and said ketone will occur to form the dihydric phenol of Formula I, and more particularly of Formulae Ia or Ib. Generally, the reaction proceeds satisfactorily at about one atmosphere of pressure and at a temperature of from about room temperature (25° C.) to about 100° C.

The amount of the acid catalyst employed is a catalytic amount. By catalytic amount is meant an amount effective to catalyze the reaction between the ketone and the phenol to produce the dihydric phenol. Generally, this amount is in the range of from about 0.1 to about 10 percent, by weight. However, in actual practice it is usually somewhat higher since the water coproduct formed in the reaction dilutes the acid catalyst and renders it somewhat less effective (slowing the reaction) than in its undiluted state.

In the preparation of the instant linear high molecular weight thermoplastic carbonate polymers of the instant invention only one dihydric phenol of Formula I may be employed, or a mixture of two or more different dihydric phenols of Formula I may be used.

The carbonate precursor that is reacted with the dihydric phenol of Formula I may be a carbonyl halide, a diaryl carbonate, or a bishaloformate. The preferred carbonate precursors are the carbonyl halides. The carbonyl halides are selected from carbonyl chloride, carbonyl bromide, and mixtures thereof. The preferred carbonyl halide is carbonyl chloride, also known as phosgene.

The preferred linear high molecular weight thermoplastic carbonate polymers of the instant invention contain at least one recurring structural unit represented by the general formula

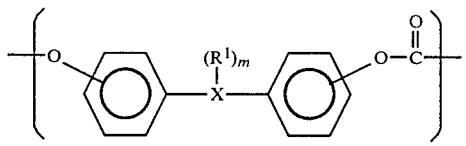

wherein $R^1$ and m are as defined hereinafore, and X is selected from monocyclic cycloalkylidene radicals containing from 10 to about 16 ring carbon atoms, preferably from 11 to about 16 ring carbon atoms, more preferably from 12 to about 16 ring carbon atoms, and most preferably from 12 to 14 ring carbon atoms.

The more preferred linear high molecular weight thermoplastic aromatic carbonate polymers of the instant invention contain at least one recurring structural unit represented by the general formula

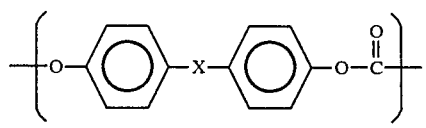

wherein X is selected from monocyclic cycloalkylidene radicals containing from 10 to about 16 ring carbon atoms, preferably from 11 to about 16 ring carbon atoms, more preferably from 12 to about 16 ring carbon atoms, and most preferably from 12 to 14 ring carbon atoms.

In order for the polycarbonates of the instant invention to exhibit improved heat resistances it is important that there be no alkyl substituent groups on the two aromatic residues. Thus, for example, if the polycarbonate is dialkyl substituted, i.e., there is present one alkyl substituent group on each of the aromatic rings, its heat resistance will be inferior as compared to a similar polycarbonate which does not contain any alkyl substituents on the aromatic rings.

The high molecular weight, linear, thermoplastic, end-capped, aromatic polycarbonates of the instant invention have an intrinsic viscosity, as measured in methylene chloride at 25° C., of at least 0.38 dl./gm., preferably at least 0.40 dl./gm., and more preferably at least 0.42 dl./gm. The upper limit of their intrinsic viscosity is such as obtained by the presence of end-capping or chain terminating groups on the ends of the carbonate polymer chains, i.e., by the use of end-capping or chain-terminating agents in the polycarbonate froming reaction. Generally, an intrinsic viscosity of about 1.5 dl./gm should not be exceeded, preferably an intrinsic viscosity of about 1.2 dl./gm., and more preferably about 1.0 dl./gm.

The term linear as used herein means that the instant polycarbonates are not macrocylic, that is to say they are linear polymers rather than cyclic polymers. The term linear thus includes both the non-branched and the randomly branched polycarbonates.

The non-branched polycarbonates contain end or terminal groups on the ends of the polymer chains, i.e., they are end-capped. Preferably they contain an average of at least 1.7 moles end-groups per mole polycarbonate, more preferably an average of at least 1.8 moles end-groups per mole polycarbonate, and most preferably 2 moles end-groups per mole polycarbonate.

Branched polycarbonates have correspondingly higher numbers of end-groups.

The instant polycarbonates are thermoplastic polymers. The term thermoplastic means that these polymers are not cross-linked and that they will not cross-link or become thermoset at moderately elevated temperatures. More particularly, the instant polycarbonates will not cross link or become thermoset under the conditions as set forth and described in U.S. Pat. No. 3,422,065, specifically under the conditions set forth in Example 4 of said patent.

Also included herein are the linear thermoplastic randomly branched polycarbonates. These randomly branched polycarbonates may be prepared by coreacting (i) a carbonate precursor, (ii) at least one dihydric phenol of Formula I, and (iii) a minor amount of a polyfunctional organic compound which functions as a branching agent. This polyfunctional organic compound is generally aromatic in nature and functions as a branching agent. This polyfunctional aromatic compound contains at least three functional groups selected from hydroxyl, carboxyl, haloformyl, carboxylic anhydride, and mixtures thereof. Some typical polyfunctional aromatic compounds are disclosed in U.S. Pat. Nos. 3,635,895 and 4,001,184, both of which are hereby incorporated herein by reference. Some illustrative non-limiting examples of these polyfunctional aromatic compounds include trimellitic anhydride, trimellitic acid, trimellityl trichloride, mellitic acid, and the like.

One method or preparing the thermoplastic high molecular weight end-capped aromatic linear polycarbonates of the instant invention involves the heterogeneous interfacial polymerization system utilizing an aqueous caustic solution, an organic water immiscible solvent such as methylene chloride, at least one dihydric phenol of the type described hereinafore, a carbonate precursor such as phosgene, a catalyst, and a molecular weight regulator or end-capping agent.

Another useful method for preparing the polycarbonates of the instant invention involves the use of an organic solvent system such as pyridine, wherein said organic solvent system may also function as an acid acceptor, at least one dihydric phenol of the type described hereinafore, a molecular weight regulator or end-capping agent, a catalyst, and a carbonate precursor such as phosgene. The catalysts which may be employed herein can be any of the known and suitable catalysts that aid the polymerization reaction of a dihydric phenol with a carbonate precursor to produce a polycarbonate. Suitable catalysts include, but are not limited to, tertiary amines such as triethylamine, quaternary ammonium compounds, and quaternary phosphonium compounds.

The molecular weight regulators or end-capping agents used may be any of the known compounds which regulate the molecular weight of the carbonate polymer by a chain terminating mechanism. These compounds include, but are not limited to, phenol, p-tertiarybutyl phenol, 2,5-dimethyl phenol, chroman-I, and the like. The amounts of these chain stoppers used are amounts effective to provide end-groups on the polymers as described hereinafore. These amounts of chain stoppers are generally in the range of about 0.1-10 mole %, preferably from about 0.5-7 mole %, and more preferably from about 1.0-5 mole % based on the moles of dihydric phenol employed.

The temperature at which the phosgenation reaction proceeds may vary from below 0° C. to above 100° C.

The reaction proceeds satisfacorily at temperatures from room temperature (25° C.) to about 50° C. Since the reaction is exothermic, the rate of phosgene addition or the use of a low boiling solvent such as methylene chloride may be used to control the reaction temperature.

The carbonate polymers of the instant invention may optionally have admixed therewith certain commonly known and used additives such as, for example, antioxidants; antistatic agents; fillers such as glass fibers, glass spheres, mica, clay, talc, and the like; impact modifiers; ultraviolet radiation absorbers such as the benzophenones, benzotriazoles, cyanoacrylates, and the like; plasticizers; hydrolytic syabilizers such as the epoxides disclosed in U.S. Pat. Nos. 3,489,716, 4,138,379, and 3,839,247, all of which are hereby incorporated herein by reference; color stabilizers such as the organophosphites disclosed in U.S. Pat. Nos. 3,305,520 and 4,118,730, both of which are hereby incorporated herein by reference; flame retardants; and the like.

Some particularly useful flame retardants are the alkali and alkaline earth metal salts of organic sulfonic acids. These types of flame retaradants are disclosed, inter alia, in U.S. Pat. Nos. 3,933,734, 3,948,851, 3,926,908, 3,916,167, 3,917,559, 3,951,810, 3,909,490, 3,853,396, 3,931,100, 3,978,024, 3,953,399 3,940,366, 3,775,367, and 3,836,490, all of which are hereby incorporated herein by reference. The amount of these flame retardants which are admixed with the polycarbonates of the instant invention are amounts effective to render the instant polycarbonates flame retardant, i.e., flame retardant amounts. Generally these amounts are in the range of from about 0.01 to about 10 weight percent. Weight percent is calculated as the amount of flame retardant in the total of flame retardant and polycarbonate present.

The impact modifiers which may be admixed with the polycarbonates of the instant invention may be any of the known materials which are known to be useful in upgrading the impact properties of aromatic polycarbonates. These materials are well known and include polyacrylates, polyolefins, rubbery dienic polymers, and styrenic polymers. Some useful imapct modifiers are disclosed, inter alia, in U.S. Pat. Nos. 3,591,659, 4,022,748, 4,096,202 and in Japanese Patent Application Announcement 1968-18611, all of which are incorportaed herein by reference. Generally, the amount of impact modifier employed is an amount effective to positively upgrade the impact strength of the instant polycarbonates, i.e., an impact modifying amount. Generally this amount is in the range of from about 2 to about 15 weight percent. Weight percent is measured as the amount of impact modifier in the total of impact modifier and polycarbonate resin present.

Another embodiment of the instant invention is a linear, thermoplastic, high molecular weight, end-capped, aromatic carbonate copolymer obtained by reacting (i) a carbonate precursor, (ii) at least one dihydric phenol of Formula I, preferably Formula Ia, and more preferably Formula Ib, and (ii) at least one dihydric phenol represented by the general formula

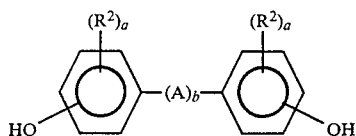

VI.

wherein:
R² is independently selected from halogen radicals, monovalent hydrocarbon radicals, and monovalent hydrocarbonoxy radicals;
a is independently selected from whole numbers having a value of from 0 to 4 inclusive;
A is selected from alkylene radicals, alkylidene radicals, cycloalkylene and cycloalkylidene radicals containing from 4 to 6 ring carbon atoms, —S—, —S—S—,

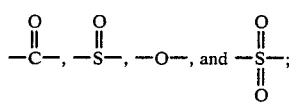

and
b is either zero or one.

The preferred halogen radicals represented by R² are chlorine and bromine.

The monovalent hydrocarbon radicals represented by R² are the alkyl radicals, the aryl radicals, the aralkyl radicals, the alkaryl radicals, and the cycloalkyl radicals. The preferred alkyl radicals represented by R² are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by R² are those containing from 6 to 12 carbon atoms, i.e., phenyl, naphthyl and biphenyl. The preferred aralkyl radicals and alkaryl radicals represented by R² are those containing from 7 to about 14 carbon atoms. Some illustrative non-limiting examples of these aralkyl and alkaryl radicals include benzyl, tolyl, ethylphenyl, and the like. The preferred cycloalkyl radicals represented by R² are those containing from 4 to about 6 ring carbon atoms and include cyclobutyl, cyclopentyl, cyclohexyl, methylcyclohexyl, and the like.

The monovalent hydrocarbonoxy radicals represented by R² are preferably selected from alkoxy radicals and aryloxy radicals. The preferred alkoxy radicals represented by R² are those containing from 1 to about 8 carbon atoms. Some illustrative non-limiting examples of these alkoxy radicals include methoxy, butoxy, isopropoxy, propxy, and the like. The preferred aryloxy radical is phenoxy.

Preferably R² is independently selected from monovalent hydrocarbon radicals, with the alkyl radicals being preferred monovalent hydrocarbon radicals.

The preferred alkylene radicals represented by A are those containing from 2 to about 6 carbon atoms. Some illustrative non-limiting examples of these alkylene radicals include ethylene, propylene, butylene, and the like. The preferred alkylidene radicals represented by A are those containing from 1 to about 6 carbon atoms. Some illustrative non-limiting examples of these alkylidene radicals include ethylidene, 1,1-propylidene, 2,2-propylidene, and the like.

The preferred dihydric phenols of Formula VI are those wherein b is one and A is selected from alkylene or alkylidene radicals.

In the dihydric phenol of Formula VI when more than one R² substituent is present on the aromatic nuclear residue they may be the same or different.

The more preferred dihydric phenols of Formula VI are the 4,4'-bisphenols.

The dihydric phenols of Formula VI are well known in the art and are generally commercially available or may readily be prepared by known methods. These phenols are generally used in preparing conventional prior art polycarbonate resins.

Some illustrative non-limiting examples of the dihydric phenols of Formula VI include:
2,2-bis(4-hydroxyphenyl)propane (bisphenol-A);
1,1-bis(3-methyl-4-hydroxyphenyl)propane;
2,2-bis(3,5-dimethyl-4-hydroxyphenyl)propane;
bis(4-hydroxyphenyl)sulfide;
3,3-bis(3-methyl-4-hydroxyphenyl)pentane;
3,3'-diethyl-4,4'-dihydroxydiphenyl; and the like.

The amount of the dihydric phenol of Formula I, preferably Ia, and more preferably Ib, utilized in this embodiment is an amount effective to improve the heat resistance, e.g., glass transition temperature, of the carbonate copolymers. Generally, this amount is in the range of from about 5 to about 90 weight percent, and preferably from about 10 to about 80 weight percent, based on the total amount of dihydric phenols of Formula I, preferably Formula Ia, and more preferably Formula Ib, and Formula VI employed.

The preferred dihydric phenol of Formula VI is 2,2-bis(4-hydroxyphenyl)propane.

The carbonate copolymers obtained by reacting (i) a carbonate precursor, (ii) at least one dihydric phenol of Formula I, preferably Formula Ia, and more preferably Ib, and (iii) at least one dihydric phenol of Formula VI contain at least the following repeating structural units:

II; and

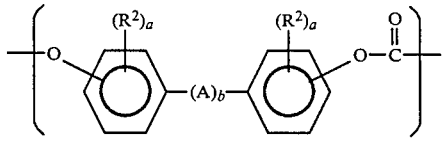

VII.

wherein R², A, a and b are as defined hereinafore.

In the practice of this embodiment of the instant invention only one dihydric phenol of Formula VI may be employed or a mixture of two or more different dihydric phenols of Formula VI may be utilized.

The procedures for preparing the high molecular weight, linear, thermoplastic, end-capped, aromatic carbonate copolymers of this embodiment are generally similar to those used for preparing the polycarbonates of the instant invention as described hereinafore. The instant copolymers are linear, contain end groups, are thermoplastic, and have a high molecualar weight. These terms are used in the same sense as appled hereinafore to the carbonate polymers of this invention. These carbonate copolymers generally have the same minimum intrinsic viscosities as the carbonate polymers described hereinafore. The instant carbonate copolymers may optionally have admixed therewith the various additives described hereinafore.

Yet another embodiment of the instant invention is a polycarbonate resin blend comprised of (i) at least one polycarbonate resin derived from (a) at least one dihydric phenol of Formula I, preferably Formula Ia, and more preferably Formula Ib, and (b) a carbonate precursor (hereinafter referred to as resin A); and (ii) at least one conventional polycarbonate resin derived from (a) at least one dihydric phenol of Formula VI, and (b) a carbonate precursor (hereinafter referred to as resin B). These blends contain an amount of resin A effective to improve the heat resistance of said blends, this amount is in the range of from about 5 to about 90 weight percent, preferably from about 10 to about 80 weight percent of resin A, based on the total amount of resins A and B present in the blends.

The blends of the instant invention may optionally have admixed therewith the aforedescribed The instant blends may generally be prepared by first preforming the resins A and B and thereafter physically mixing or blending these resin together.

Still another embodiment of the instant invention are copolyester-carbonates derived from (i) a carbonate precursor, (ii) at least one dihydric phenol represented by Formula I, preferably Formula Ia, and more preferably Formula Ib, and (iii) at least one difunctional carboxylic acid or an ester forming reactive derivative therof.

Briefly stated, the copolyester-carbonates comprise recurring carbonate groups, carboxylate groups, and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonates contain ester bonds and carbonate bonds in the polymer chain, wherein the amount of the ester bonds is in the range of from about 25 to about 90 mole %, prefereably from about 35 to about 80 mole %. For example, 5 moles of bisphenol-A reacting completely with 4 moles of isophthaloyl dichloride and 1 mole of phosgene would give a copolyester-carbonate of 80 mole % ester bonds.

Conventional copolyester-carbonates in general, and methods for their preparation, are disclosed in U.S. Pat. No. 3,169,121, which is hereby incorporated by reference.

In general, any difunctional carboxylic acid conventionally used in the preparation of linear polyesters may be utilized in the preparation of the linear copolyester-carbonate resins of the present invention. The carboxylic acids which may be used include the aliphatic carboxylic acids, aliphatic-aromatic carboxylic acids, and aromatic carboxylic acids. These acids are disclosed in the aforementoned U.S. Pat. No. 3,169,121, which is hereby incorporated herein by reference.

The difunctional carboxylic acids which may be utilized in the preparation of the linear, high molecular weight, end-capped, thermoplastic aromatic copolyester-carbonate resins of the instant invention generally conform to the general formula VIII.

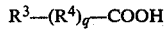

wherein $R^4$ is an alkylene, alkylidene, aralkylene, aralkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and the like. $R^3$ is either a carboxyl group or a hydroxyl group.

The letter q represents one where $R^3$ is a hydroxyl group and either zero or one where $R^3$ is a carboxyl group.

Preferred difunctional carboxylic acids are the aromatic difunctional carboxylic acids, i.e., those acids of Formula VIII where q is one, $R^3$ is a carboxyl or hydroxyl group, and $R^4$ is an aromatic group such as phenylene, naphthylene, biphenylene, substituted phenylene, and the like. The preferred aromatic difunctional carboxylic acids are those represented by the general formula

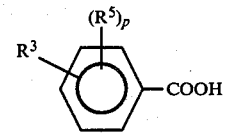

wherein $R^3$ is as defined hereinafore, $R^5$ is independently selected from halogen radicals, monovalent hydrocarbon radicals, and monovalent hydrocarbonoxy radicals, and p represents a whole number having a value of from 0 to 4 inclusive.

The preferred halogen radicals represented by $R^5$ are chlorine and bromine. The monovalent hydrocarbon radicals represented by R5 are selected from alkyl radicals. aryl radicals, alkaryl radicals, aralkyl radicals, and cycloalkyl radicals. The preferred alkyl radicals, aryl radicals, alkaryl radicals, aralkyl radicals and cycloalkyl radicals are the same as those defined for R hereinafore. The monovalent hydrocarbonoxy radicals represented by $R^5$ are selected from alkoxy radicals and aryloxy radicals. The preferred alkoxy radicals and aryloxy radicals represented by $R^5$ are the same as those defined for R hereinafore.

Preferred radicals represented by $R^5$ are the monovalent hydrocarbon radicals, with the alkyl radicals being the preferred monovalent hydrocarbon radicals.

Mixtures of two or more different difunctional acids may be employed as well as single individual difunctional carboxylic acids. Therefore, where the term difunctional carboxylic acid is used herein it is meant to include mixtures of two or more different difunctional carboxylic acids as well as single difunctional carboxylic acids.

Particularly useful aromatic difunctional carboxylic acids are isophthalic acid, terephthalic acid, and mixtures thereof. A particularly useful mixture of isophthalic acid and terephthalic acid is one wherein the weight ratio of isophthalic acid to terephthalic acid is in the range of from 1:10 to 9.8:0.2.

Rather than utilizng the difunctional carboxylic acids per se it is preferred to employ their ester forming reactive derivatives such as, for example, the acid halides. Particularly useful acid halides which may be employed as the ester precursor are the acid chlorides. Thus, for example, instead of using isophthalic acid, terephthalic acid, or mixtures thereof, it is preferred to utilize isophthaloyl dichloride, terephthaloyl dichloride, or mixtures thereof.

One of the methods of preparing the linear, high molecular weight, thermoplastic, end-capped, aromatic copolyester-carbonates of the instant invention involves the heterogeneous interfacial polymerization system utilizing an aqueous caustic solution, an organic water immiscible solvent, at least one dihydric phenol represented by Formula I, preferably Formula Ia, and more preferably by Formula Ib, at least one ester precusror which may be a difunctional carboxylic acid or an ester forming reactive derivative thereof, a catalyst, a molecular weight regulator or an end-capping agent, and a carbonate precursor. A preferred heterogeneous interfacial polymerization system is one which utilizes phosgene as the carbonate precursor and methylene chloride or chlorobenzene as the organic solvent.

The reaction conditions, catalysts and chain terminator or molecular weight regulators utilized are generally the same as those described hereinafore for the preparation of the polycarbonates of the instant invention.

The instant copolyester-carbonates are thermoplastic, have a high molecular weight, are linear, and are end-capped. The definition of these terms as applied to the instant copolyester-carbonates is the same as that applied to the polycarbonates described hereinafore.

The linear copolyester-carbonate resins of the instant invention may also optionally have admixed therewith the various additives described supra, particularly a flame retardant amount of at least one flame retardant and/or an impact modifying amount of at least one impact modifier.

Another embodiment of the instant invention is a copolyester-carbonate resin derived from (i) a carbonate precursor, (ii) at least one ester precursor, (iii) at least one dihydric phenol of Formula I, preferably of Formula Ia, and more preferably of Formula Ib, and (iv) at least one dihydric phenol of Formula VI. In this copolyester-carbonate resin the amount of dihydric phenol of Formula I, preferably Formula Ia, and more preferably Formula Ib, employed is an amount effective to improve the heat resistance of the resin. Generally, this amount is in the range of from about 5 to about 90 weight percent, preferably from about 10 to about 80 weight percent, based on the amount of dihydric phenols of Formula I, preferably Formula Ia, and more preferably of Formula Ib and Formula VI present.

These resins may optionally have admixed therewith the aforedescribed additives.

Still another embodiment of the instant invention is a linear copolyester-carbonate blend comprised of (i) at least one linear, thermoplastic, end-capped, high molecular weight, aromatic copolyester-carbonate resin of the instant invention, i.e., one derived from (a) a carbonate precursor, (b) at least one ester precursor, (c) at least one dihydric phenol of Formula I, preferably of Formula Ia, and more preferably of Formula Ib (hereinafter referred to as copolyester-carbonate resin C); and (ii) at least one conventional copolyester-carbonate resin which is derived from (a) a carbonate precursor, (b) at least one ester precursor, and (c) at least one dihydric phenol of Formula VI (hereinafter referred to as copolyester-carbonate resin D).

The blends of this embodiment contain an amount of resin C effective to improve the heat resistance of the blends. Generally this amount is in the range of from about 5 to about 90 weight percent, preferably from about 10 to about 80 weight percent, based on the amount of copolyester-carbonate resins C and D present in the blends.

These blends may also optionally contain the various aforedescribed additives.

Also included within the scope of the instant linear copolyester-carbonates are the linear, thermoplastic, high molecular weight, end-capped, aromatic, randomly branched copolyester-carbonates. These branched copolyester-carbonates may be prepared by the use of the branching agents described hereinafore for the preparation of the randomly branched polycarbonates.

Also included within the scope of the instant invention are blends of the copolyester-carbonates of the instant invention (copolyester-carbonate resins C) with the polycarbonates of the instant invention (polycarbonate resins A); blends of copolyester-carbonates of the instant invention (copolyester-carbonate resins C) with conventional polycarbonates (polycarbonate resins B); and blends of polycarbonates of the instant invention (polycarbonate resins A) with conventional copolyester-carbonates (copolyester-carbonate resins D).

These blends generally contain from about 1 to about 99 weight percent of the copolyester-carbonate resin and from about 99 to about 1 weight percent polycarbonate resin, preferably from about 5 to about 95 weight percent copolyester-carbonate and from about 95 to about 5 weight percent polycarbonate. These blends may optionally contain the additives set forth hereinafore.

The high molecular weight, linear, aromatic copolyester-carbonates of the instant invention generally have a number average molecular weight in the range of from about 10,000 to about 200,000, preferably in the range of from about 20,000 to about 100,000.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis unless otherwise indicated.

The following examples illustrate polycarbonates falling outside the scope of the instant invention and are presented for comparative purposes only.

EXAMPLE 1

This example illustrates the preparation of a bisphenol-A type polycarbonate.

Into a mixture of 2283 grams of pure 4,4'-isopropylidenebisphenol (bisphenol-A) (mp 156°–157° C.; 10.0 mole grams), 5700 grams of water, 9275 grams methylene chloride, 32 grams phenol, and 10.0 grams of triethylamine were introduced, at ambient temperature, 1180 grams of phsogene over a period of 97 minutes while maintaining the pH of the two phase system at about 11, i.e., pH 10–12.5, by simultaneously adding a 25% aqueous sodium hydroxide solution. At the end of the addition period the pH of the aqueous phase was 11.7 and the bisphenol-A content of this phase was less than 1 part per million (ppm) as determined by ultraviolet analysis.

The methylene chloride phase was separated from the aqueous phase, washed with an excess of dilute (0.01N) aqueous HCl and then washed three times with deionized water. The polymer was precipitated by steam and dried at 95° C. The resultant, pure bisphenol-A polycarbonate, which had an intrinsic viscosity (IV) in methylene chloride at 25° C. of 0.572 dl./gm., was fed to an extruder, which extruder was operated at about 550° F., and the extrudate was comminuted into pellets.

The pellets were injection molded at about 600° F. into test bars of about 5"×½"×1/16" thick. The Heat Distortion Temperature Under Load (DTUL) of the test bars was determined to be 128° C. The Tg of this polycarbonate was 149° C.

The second order glass transition temperature (Tg) is determined using a Perkins-Elmer DSC-2B instrument which measures the second order glass transition temperature by differential scanning calorimetry. The Tg is an indication of the heat resistance of the polymer. Generally, the higher the Tg the more heat resistant is the polymer.

EXAMPLE 2

This example illustrates the preparation of a dimethyl substituted cyclododecylidene polycarbonate falling outside the scope of the instant invention.

Into a slurry of 9.5 grams (0.025 mole) of 1,1-bis(3-methyl-4-hydrxoyphenyl)cyclododecane (m.p. 205°–206° C.), 0.1 millilier of triethylamine 0.02 gram (1 mole %) of phenol, 200 milliliters of methylene chloride, and 150 milliliters of water there is added sufficient aqueous sodium hydroxide solution to bring the pH to 11.0. Phosgene is then introduced into this reaction mixture at a rate of 0.5 gram per minute for a period of 10 minutes while maintaining the pH of the reaction mixture at 10.5–11.4 by the addition of the aqueous caustic solution. After addition of the phosgene ceases the methylene chloride phase is separated from the aqueous phase, washed with an excess of dilute (0.01N) HCl and is then washed three times with deionized water. The polymer is then precipitated with methanol and dried at 95° C. The Tg of this polymer is determined to be 202° C.

EXAMPLE 3

This example illustrates the preparation of a cyclohexylidene polycarbonate falling outside the scope of the instant invention.

To a reactor vessel is added an aqueous caustic solution of 26.8 grams (0.1 mole) of 1,1-bis(4-hydroxyphenyl)cyclohexane, 8 grams of sodium hydroxide, and 170 milliliters of water, followed by the addition of 0.3 milliliter of triethylamine and 400 milliliters of methylene chloride. Phosgene is introduced into this well stirred mixture at a rate of 0.5 gram per minute for a period of 10 minutes while maintaining the pH at 12.4 by the use of 25% aqueous sodium hydroxide solution. The pH is then lowered to 11 and additional phosgene is introduced into the reaction mixture at a rate of 0.5 gram per minute for 32 minutes. After addition of the phosgene ceases the methylene chloride phase is separated from the aqueous phase, washed with an excess of dilute (0.01N) HCl, and is then washed three times with deionized water. The polymer is precipitated with methanol and dried at 95° C. The second order glass transition temperature (Tg) of this polymer is determined to be 171° C.

EXAMPLE 4

This example illustrates the preparation of a dialkylated cyclohexylidene polycarbonate falling outside the scope of the instant invention.

To a reactor vessel are introduced 2965 grams (10 moles) of 1,1-bis(3-methyl-4-hydroxyphenyl) cyclohexane, 7 liters of methylene chloride, 5.5 liters of water, 28 milliliters of triethylamine, and 32.9 grams of phenol. Sufficient 25% aqueous sodium hydroxide solution is added to this reaction mixture to maintain a pH of about 11. Phosgene is then introduced into the reaction mixture at a rate of 36 grams per minute for a period of 32 minutes while maintaining the pH at about 11 by the use of the aqueous caustic solution. After addition of the phosgene ceases the methylene chloride phase is separated from the aqueous phase, washed with dilute (0.01N) HCl, and then washed three times with deionized water. The polymer is then precipitated by steam and is dried at 95° C. The Tg of this polymer is determined to be 132° C.

EXAMPLE 5

This example illustrates the preparation of a dialkyl substituted cyclopentadecylidene polycarbonate falling outside the scope of the instant invention.

Into a reaction mixture containing 5 grams (0.0118 mole) of 1,1-bis(3-methyl-4-hydroxyphenyl) cyclopentadecane (m.p. 213–214° C.), 0.033 milliliter of triethylamine, 400 milliliters of methylene chloride, and 300 milliliters of water, there is added sufficient 25% aqueous sodium hydroxide solution to bring the pH of the reaction mixture to about 11. Phosgene is introduced into this well stirred reaction mixture at a rate of 0.5 gram per minute for a period of 6.5 minutes while maintaining the pH at about 11 by the use of the aqueous caustic solution. After the addition of the phosgene ceases the reaction mixture is stirred for 5 minutes, the methylene chloride phase is separated from the aqueous phase, and is washed once with excess dilute (0.01N) HCl and three times with deionized water. The polymer is then precipitated with methanol and dried at 95° C. The Tg of this polymer is determined to be 159° C.

EXAMPLE 6

This example illustrates the preparation of a 4,4'-cyclooctylidene bisphenol polycarbonate falling outside the scope of the instant invention.

Into a solution containing 4 grams (0.0135 mole) of 1,1-bis(4-hydroxyphenyl)cyclooctane (m.p. 197°–199° C.) and 100 milliliters of pyridine, there is introduced phosgene at a rate of 0.2 gram per minute for a period of 20 minutes. During the phosgene addition period the originally colorless solution turns a muddy green color. After phosgene addition ceases the reaction mixture is stirred for 10 minutes. The reaction mixture is then added to an excess of methanol and stirred in a Warring blender. The precipitated polymer is filtered, and the filter cake is then slurried with water, filtered and washed. The filter cake is dried in a vacuum oven at 50° C. The resultant polycarbonate is found to have an intrinsic viscosity in methylene chloride at 25° C. of 0.427 dl./gm. This polymer has a second order glass transition temperature (Tg) of 145° C.

The following example illustrates a conventional copolyester-carbonate resin falling outside the scope of the instant invention. This example is presented for comparative purposes only.

EXAMPLE 7

To a reactor vessel were added 400 milliliters of methylene chloride, 300 milliliters of water, 34.2 grams of bisphenol-A, 0.35 gram of phenol, and 0.42 milliliter of triethylamine. At a pH of about 11, 7.6 grams of isophthaloyl dichloride dissolved in methylene chloride, 10 milliliters, were added over a 15 minute period, while maintaining the pH at about 11 by the addition of 35% aqueous caustic. After the addition of the isophthaloyl dichloride was terminated 6 grams of phosgene were introduced over a 15 minute period, while controlling the pH at about 11 by the addition of 35% aqueous caustic solution. The polymer mixture was diluted with methylene chloride and the brine phase was separated. The resulting polymer containing phase was washed with HCl and then with water, and the polymer was then recovered by methanol precipitation. The resultant copolyester-carbonate was found to have an intrinsic viscosity of 0.530 dl./gm. and a Tg of 162.2° C.

The following examples illustrate the preparation of the non-alkyl substituted cycloalkylidene bisphenols of the instant invention.

EXAMPLE 8

This example illustrates the preparation of 4,4'-cyclododecylidenebisphenol.

To a 3 liter round bottom flask equipped with a stirrer, reflux condenser, thermometer and gas inlet tube, were charged 1647 grams (17.5 moles) of phenol, 478 grams (2.62 moles) of cyclododecanone, and 15 milliliters of n-butylmercaptan. Heat was applied via a heating mantle and when the reaction mixture became liquid at 58° C. anhydrous hydrogen chloride was introduced until the solution became saturated. Stirring was continued between 52° and 60° C. for several hours, during which period white solids began to separate out from the reddish-orange reaction mixture. When gas chromatographic analysis of samples taken from the slurry indicated the absence of macrocyclic ketone, the warm reaction mixture was filtered by suction and the resultant filter cake was washed with methylene chloride in order to remove much of the excess phenol. The filter cake was then slurried up with fresh methylene chloride, filtered and rinsed again with more solvent. Analysis by gas chromatography of the dried filter cake, which weighed 849.8 grams (2.41 moles), corresponding to a 92% yield, and melted at 207°–208.5° C, indicated that it was 99.9% pure and that it had a retention time of 26.07 minutes relative to p-cumylphenyl, which emerged at 13.91 minutes. Analysis by Infrared spectroscopy, Ultraviolet spectroscopy, $^1$H (proton) NMR spectroscopy, $^{13}$C (carbon) NMR spectroscopy, and Mass spectrometry confirmed that the bisphenol product was 1,1-bis(4-hydroxyphenyl) cyclododecane.

EXAMPLE 9

This example illustrates the preparation of 1,1-bis(4-hydroxyphenyl)cyclodecane.

Into a solution of 1.04 grams (0.0067 mole) of cyclododecanone, 4.12 grams (0.044 mole) of phenol 1 milliliter of methylene chloride, and 0.04 milliliter of n-butyl mercaptan there is introduced, with stirring, anhydrous hydrogen chloride gas while maintaining the temperature of the reaction mixture at about 14°–16° C. Solids begin to separate out from the reaction mixture and when the reaction mixture becomes too thick to stir an additional 8 milliliters of methylene chloride are added. The reaction is followed by gas chromatographic analysis of samples removed from the reaction mixture. When gas chromatographic analysis of the samples indicates the absence of the macrocylic ketone the reaction is terminated. Analysis of the resultant 1,1-bis(4-hydroxyphenyl)cyclodecane shows that it has a retention time of 28.0 minutes relative to p-cumylphenol which emerges at 16.91 minutes.

EXAMPLE 10

This example illustrates the preparation of 1,1-bis(4-hydroxyphenyl)cycloundecane.

Into a solution of 1 gram (0.066 mole) of cycloundecanone, 3.8 grams (0.04 mole) of phenol, 2 milliliters of methylene chloride, and 0.1 milliliter of n-butylmercaptan there is introduced, with stirring, anhydrous hydrogen chloride gas while maintaining the temperature of the reaction mixture at about 14°–16° C. Solids begin to separate out from the reaction mixture and when the reaction mixture becomes too thick to stir additional methylene chloride is added. The reaction is followed by gas chromatographic analysis of samples removed from the reaction mixture. When gas chromatographic analysis of the samples indicates the absence of the macrocyclic ketone the reaction mixture is filtered by suction and the solids are washed with methylene chloride. The solids are recrystallized from aqueous methanol. Analysis by gas chromatography of the white crystals, which melt at 183°–184° C., shows that they have a retention time of 25.57 minutes relative to p-cumylphenol which emerges at 14.04 minutes.

EXAMPLE 11

This example illustrates the preparation of 1,1-bis(4-hydroxyphenyl)cyclopentadecane.

Into a warm reaction mixture, kept at about 48° C., consisting of 5 grams (0.0223 mole) of cyclopentadecanone, 47.1 grams (0.5 mole) phenol, and 0.5 milliliter of n-butyl mercaptan there is introduced anhydrous hydrogen chloride gas while maintaining the temperature at about 48° C. Solids begin to separate out of the liquid phase. The reaction is followed by gas chromatographic analysis of samples removed from the reaction mixture. When gas chromatographic analysis of these samples indicates the absence of the macrocyclic ketone the reaction mixture is filtered and the solids are washed with methylene chloride. The solids are then recrystallized from aqueous methanol to yield the pure bisphenol. Analysis by gas chromatography of the solids, which melt at 229°–230.5° C., shows that they have a retention time of 30.00 minutes relative to p-cumyl phenol which emerges at 15.83 minutes.

The following examples illustrate the polymers of the instant invention.

EXAMPLE 12

This example illustrates the preparation of a polycarbonate derived from 1,1-bis(4-hydroxyphenyl) cyclododecane.

Into a slurry of 35.2 grams (0.01 mole) of 1,1-bis(4-hydroxyphenyl)cyclododecane, 0.4 milliliter of tirethylamine, 0.06 gram (0.25 mole %) of phenol, and 300 milliliters of water there was added sufficient 25% aqueous sodium hydroxide solution to bring the pH to 13. Phosgene was then introduced into this reaction mixture at the rate of 0.5 gram per minute for a period of 25 minutes while maintaining the pH of the reaction mixture at 10.5–11.5 by the addition of the aqueous caustic solution. After the addition of phosgene ceased the methylene chloride phase was separated from the aqueous phase, washed with an excess of dilute (0.01N) aqueous HCl, and then washed three times with deionized water. The polymer was precipitated with methanol and dried at 95° C.

The second order glass transition temperature (Tg) of this polymer was determined to be 240.0° C.

That this polymer contained recurring structural units comprised of the residues of 1,1-bis(4-hydroxyphenyl)cyclododecane joined together by carbonate bonds was confirmed by Infrared spectroscopy, Ultraviolet spectroscopy, spectroscopy, $^1$H (proton) NMR spectroscopy, and $^{13}$C (carbon) NMR spectroscopy.

This polymer had an intrinsic viscosity in methylene chloride at 25° C. of 0.767 dl./gm.

EXAMPLE 13

This example illustrates the preparation of a polycarbonate derived from 1,1-bis(4-hydroxyphenyl) cyclopentadecane.

Into a reaction mixture containing 4.1 grams (0.01 mole) of 1,1-bis(4-hydroxyphenyl)cyclopentadecane, 0.03 milliliter of triethylamine, 0.004 gram of phenol, 200 milliliters of methylene chloride, and 150 milliliters of water there was added sufficient 25% aqueous sodium hydroxide solution to bring the pH to about 11. Phosgene was then introduced into this well stirred reaction mixture at a rate of 0.2 gram per minute for a period of 20 minutes while maintaining the pH of the reaction mixture at about 11 by the use of the aqueous caustic solution. After addition of the phosgene ceased the reaction mixture was stirred for 5 minutes, the methylene chloride phase was separated from the aqueous phase and was washed once with dilute (0.01N) HCl and three times with deionized water. The polymer was precipitated with methanol and dried at 95° C. This polymer had an intrinsic viscosity in methylene chloride at 25° C. of 0.38 dl./gm. The Tg of this polycarbonate was determined to be 188° C.

EXAMPLE 14

This example illustrates the preparation of a carbonate copolymer derived from 50 mole % bisphenol-A and 50 mole % 1,1-bis(4-hydroxyphenyl)cyclododecane.

Into a mixture of 42.1 grams (0.125 mole) of 1,1-bis(4-hydroxyphenyl)cyclododecane, 28.5 grams (0.125 mole) of bisphenol-A, 0.7 milliliter of triethylamine, 0.12 gram (0.5 mole %) of phenol, 400 milliliters of methylene chloride, and 300 milliliters of water was introduced, at ambient temperature and a pH of about 11, i.e., 10.2-11.4, phosgene at the rate of 1 gram per minute for a period of 27 minutes while maintaining the pH of the two phase system at about 10.2-11.4 by the addition of a 25% aqueous sodium hydroxide solution. After addition of the phosgene had been terminated the methylene chloride phase was separated from the aqueous phase, washed with an excess of dilute (0.01N) aqueous HCl and then washed three times with deionized water. The polymer was then precipitated with methanol. The polymer had a second order glass trnasition temperature (Tg) of above 186° C. and an intrinsic viscosity of 0.383 dl./gm.

EXAMPLE 15

This example illustrates the preparation of a carbonate copolymer derived from 10 mole % of 1,1-bis(4-hydroxyphenyl)cyclododecane and 90 mole % of bisphenol-A.

Into a mixture of 352.2 grams (1.0 mole) of 1,1-bis(4-hydroxyphenyl)cyclododecane, 2052 grams (9.0 moles) of bisphenol-A, 7 liters of methylene chloride, 6.5 liters of water, 28 milliliters of triethylamine, and 104.2 grams (3.5 mole %) of chroman-I (containing 10% bisphenol-A) were introduced at ambient temperature 1189 grams of phosgene over a period of 97 minutes while maintaining the pH of the two phase system at about 11 to 11.2 by the addition of a 25% aqueous sodium hydroxide solution. After addition of the phosgene had been terminated the methylene chloride phase was separated from the aqueous phase, washed with an excess of dilute (0.01N) HCl and then washed three times with deionized water. The polymer was precipitated with steam and dried at 95° C. The resultant polycarbonate, which had an intrinsic viscosity in methylene chloride at 25° C. of 0.475 dl,/gm., was fed to an extruder, which extruder was operated at about 550° F., and the extrudate was comminuted into pellets.

The pellets were injection molded at about 600° F. into test bars of about 5"×½"×1/16" thick. The Heat Distortion Temperature Under Load (DTUL) of the test bars was determined according to ASTM D-648, at 264 psi. The DTUL of the test bars was 142.5° C.

The Tg of this polymer was determined to be 165° C.

The following example illustrates the preparation of a copolyester-carbonate resin of the instant invention.

EXAMPLE 16

To a reactor vessel there were added 400 milliliters of methylene chloride, 300 milliliters of water, 35.2 grams of 1,1-bis(4-hydroxyphenyl)cyclo-dodecane, 0.09 grams of phenol, and 0.28 milliliter of triethylamine. At a pH of about 11, 5.1 grams of isophthaloyl dichloride were added over a 15 minute period while maintaining the pH at about 11 by the addition of 35% aqueous caustic solution. After addition of the isophthaloyl dichloride was terminated 8.9 grams of phosgene were introduced over a 15 minute period while maintaining the pH at about 11 by the introduction of the 35% aqueous caustic solution. The polymer mixture was diluted with methylene chloride and the brine phase was separated. The resultant polymer containing organic phase was washed with dilute HCl and then with water, and the polymer was recovered by methanol precipitation. The resultant copolyester-carbonate polymer had an intrinsic viscosity in methylene chloride at 25° C. of 0.472 dl./gm. and a Tg of 240° C.

The second order glass transition temeperatures (Tg) of the polymers of Examples 1-7 (comparative) and Examples 12-16, as well as the dihydric phenols from which these polymers are derived, are set forth in Table I.

TABLE I

| Example No. | Dihydric Phenol | Tg of resultant polymer (°C.) |
|---|---|---|
| 1 (comparative) | bisphenol-A | 149 |
| 2 (comparative) | 1,1-bis(3-methyl-4-hydroxyphenyl)cyclododecane | 202 |
| 3 (comparative) | 1,1-bis(4-hydroxyphenyl)cyclohexane | 171 |
| 4 (comparative) | 1,1-bis(3-methyl-4-hydroxyphenyl)cyclohexane | 132 |
| 5 (comparative) | 1,1-bis(3-methyl-4-hydroxyphenyl)cyclopentadecane | 159 |
| 6 (comparative) | 1,1-bis(4-hydroxyphenyl)cyclooctane | 145 |
| 7 (copolyester-carbonate) (comparative) | bisphenol-A | 162.2 |
| 12 | 1,1-bis(4-hydroxyphenyl)cyclododecane | 240.4 |
| 13 | 1,1-bis(4-hydroxyphenyl)cyclopentadecane | 188 |

TABLE I-continued

| Example No. | Dihydric Phenol | Tg of resultant polymer (°C.) |
|---|---|---|
| 14 | 50 mole % bisphenol-A + 50 mole % 1,1-bis(4-hydroxyphenyl)cyclododecane | 186 |
| 15 | 90 mole % bisphenol-A + 10 mole % 1,1-bis(4-hydroxyphenyl)cyclododecane | 165 |
| 16 (copolyester-carbonate) | 1,1-bis(4-hydroxyphenyl)cyclododecane | 240.0 |

As illustrated by the data in Table I the polymers of the instant invention (Examples 12-16) exhibit improved heat resistances as compared with the polymers falling outside the scope of the instant invention (Examples 1-7). The non-alkyl substituted polycarbonates of the instant invention (Examples 12 and 13) exhibit improved heat resistance as compared to the comparable dialkyl substituted polycarbonates falling outside the scope of the instant invention (Examples 2-5).

Additionally a polycarbonate prepared substantially in accordance with the procedure of Example 12 was tested to determine whether it would remain thermoplastic under conditions of elevated temeratures. Two grams of this polymer were dissolved in 38 grams of methylene chloride and cast into a film about 2 mils thick. This film was cut into strips about 1 cm. wide. The film strips were then evaluated under the conditions as set forth in Example 4 of U.S. Pat. No. 3,433,065. More particularly, two strips of film were placed inside an air-circulating oven that was kept at 195° C. One of these film strips was left in the oven for a period of one hour and the other strip was left in said oven for a periodoftwo hours. These two strips were then immersed in bottles containing sufficient methylene chloride to make a 5% methylene chloride solution and then the bottles were placed on a shaker. After 5 minutes the bottles were removed from the shaker and their contents examined visually. Visual inspection showed that both the film strips, i.e., the one heated for one hour and the one heated for two hours, were completely soluble in the methylene chloride solution.

Additionally, 11.0 grams of the polycarbonate prepared substantially in accordance with the procedure of Example 12 was dissolved in 50 milliliters of methylene chloride. To this solution was added 0.275 gram of dibenzoyl peroxide and the resultant clear solution was cast into a film of 1 mil thickness. This film was cut into strips about 1 cm. wide. These strips were then placed inside an air-circulating oven kept at 150° C. After a period of 8 hours one strip was placed in a bottle containing 40 milliliters of methylene chloride. It dissolved completely in a very short period of time.

This indicates that the polycarbonates of the instant invention, particularly that of Example 12, are quite different from the polycarbonates disclosed in said U.S. Pat. No. 3,422,065.

The polymers of the instant invention are useful in the production of films, sheets, molded articles, and the like.

Obviously other modifications and variations of the present invention are possible in light of the above teachings. It is, therefore, to be understood that changes may be made in the particular embodiments of the invention described and claimed herein which are within the full intended scope of the invention as defined by the appended claims.

What is claimed is:

1. A thermoplastic, linear, high molecular weight, end-capped aromatic polycarbonate polymer exhibiting improved heat resistance which remains thermoplastic after heating for a time of about one hour at about 195° C. in air derived from:
   (i) a carbonate precursor; and
   (ii) at least one dihydric phenol represented by the general formula

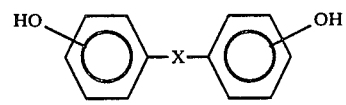

wherein X is selected from monocyclic cycloalkylidene radicals containing from 12 to about 16 rings carbon atoms.

2. The polymer of claim 1 which has an intrinsic viscosity of at least 0.40 dl./gm as measured in methylene chloride at 25° C.

3. The polymer of claim 2 which has an intrinsic viscosity of at least 0.42 dl./gm as measured in methylene chloride at 25° C.

4. The polymer of claim 1 wherein said cycloalkylidene radical contains from 12 to 14 ring carbon atoms.

5. The polymer of claim 4 wherein said cycloalkylidene radical is a cyclododecylidene radical.

6. The polymer of claim 1 wherein said dihydric phenol is represented by the general formula

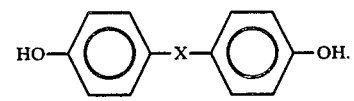

7. The polymer of claim 6 wherein said cyclaolkylidene radical contains from 12 to 14 ring carbon atoms.

8. The polymer of claim 7 wherein said cycloalkylidene radical is cyclododecylidene.

9. The polymer of claim 8 wherein said carbonate precursor is phosgene.

10. The polymer of claim 9 which has an intrinsic viscosity in methylene chloride at 25° C. of at least 0.38 dl./gm.

11. The polymer of claim 10 which has an intrinsic viscosity of at least 0.40 dl./gm.

12. The polymer of claim 1 which is derived from (i), (ii), and (iii) at least one dihydric phenol represented by the general formula

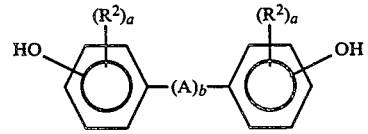

wherein:
R$^2$ is independently selected from halogen radicals, monovalent hydrocarbon radicals, or monovalent hydrocarbonoxy radicals;
a is independently selected from integers having a value of from 0 to 4 inclusive;
A is selected from alkylene radicals, alkylidene radicals, cycloalkylene or cycloalkylidene radicals containing from 4 to 6 ring carbon atoms, —S—, —O—, —S—S—,

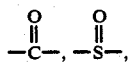

or —SO$_2$—; and b is either zero or one.

13. The polymer of claim 12 which contains an amount of the residue of the dihydric phenol of (ii) effective to improve the heat resistance thereof.

14. The polymer of claim 13 wherein said amount is from about 5 to about 90 weight percent, based on the total amounts of the residues of the dihydric phenol (ii) and dihydric phenol (iii) present in said polymer.

15. The polymer of claim 14 wherein said dihydrci phenol (iii) is bisphenol-A.

16. The polymer of claim 15 wherein said dihydric phenol (ii) is 1,1-bis(4-hydroxyphenyl) cyclododecane.

17. The polymer of claim 16 wherein said carbonate precursor is phosgene.

18. The polymer of claim 1 which has admixed therewith a flame retardant amount of at least one flame retardant compound.

19. The polymer of claim 18 wherein said flame retardant compound is selected from the alkali and alkaline earth metal salts of sulfonic 20. The polymer of claim 1 which has admixed therewith an impact modifying amount of at least one impact modifier.

21. The polymer of claim 12 which has admixed therewith a flame retardant amount of at least one flame retardant compound.

22. The polymer of claim 21 wherein said flame retaradant compound is selected from the alkali and alkaline earth metal salts of organic sulfonic acids.

23. The polymer of claim 12 which has admixed therewith an impact modifying amount of at least one impact modifier.

24. A thermoplastic, linear, high molecular weight, end-capped aromatic polycarbonate polymer exhibiting improved heat resistance which remains thermoplastic after heating for a time of about one hour at about 195° C. in air comprised of at least one recurring structural unit represented by the formula

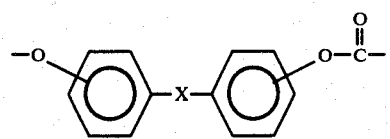

wherein X is selected from monocyclic cycloalkylidene radicals containing from 12 to about 16 ring carbon atoms.

25. The polymer of claim 24 which has an intrinsic viscosity, as measured in methylene chloride at 25° C., of at least 0.40 dl./gm.

26. The polymer of claim 25 which has an intrinsic viscosity as measured in methylene chloride at 25° C., of at least 0.42 dl./gm.

27. The polymer of claim 24 wherein said monocyclic cycloalkylidene radical contains from 12 to 14 ring carbon atoms.

28. The polymer of claim 27 wherein said monocyclic cycloalkylidene radical is the cyclododecylidene radical.

29. The polymer of claim 24 wherein said recurring structural unit is represented by the formula

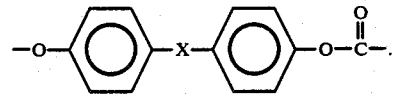

30. The polymer of claim 29 which has an intrinsic viscosity of at least 0.40 dl./gm. as measured in methylene chloride at 25° C.

31. The polymer of claim 30 which has an intrinsic viscosity of at least 0.42 dl./gm. as measured in methylene chloride at 25° C.

32. The polymer of claim 29 wherein said monocyclic cycloalkylidene radical contains from 12 to 14 ring carbon atoms.

33. The polymer of claim 32 wherein said monocyclic cycloalkylidene radical is cyclododecylidene.

* * * * *

UNITED STATES PATENT AND TRADEMARK OFFICE
CERTIFICATE OF CORRECTION

PATENT NO. : 4,638,027
DATED : January 20, 1987
INVENTOR(S) : Victor Mark and Charles V. Hedges It is certified that error appears in the above-identified patent and that said Letters Patent is hereby corrected as shown below:

Column 24, line 22 after "at 25°C" should read "and which remains thermoplastic after heating in air for a time of up to about one hour at about 195°C".

Column 25, line 28, after "sulfonic" add the word "acid".

Column 26, line 16 after "of at least" should read "of at least about 0.40 dl./gm, and which is thermoplastic after heating for a time of up to about one hour at about 195°C".

Signed and Sealed this

Sixteenth Day of February, 1988

Attest:

DONALD J. QUIGG

Attesting Officer  Commissioner of Patents and Trademarks